J. B. CAREY.
STONE BOAT.
APPLICATION FILED OCT. 29, 1909.
966,164.
Patented Aug. 2, 1910.
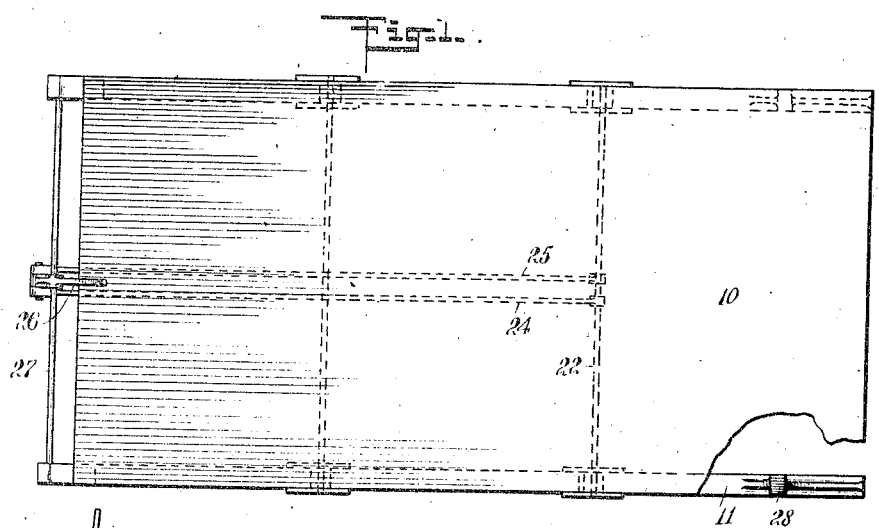
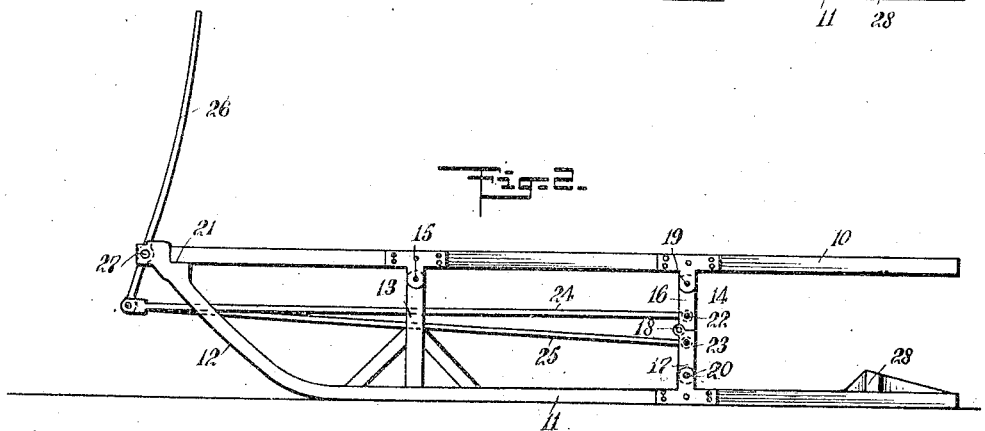
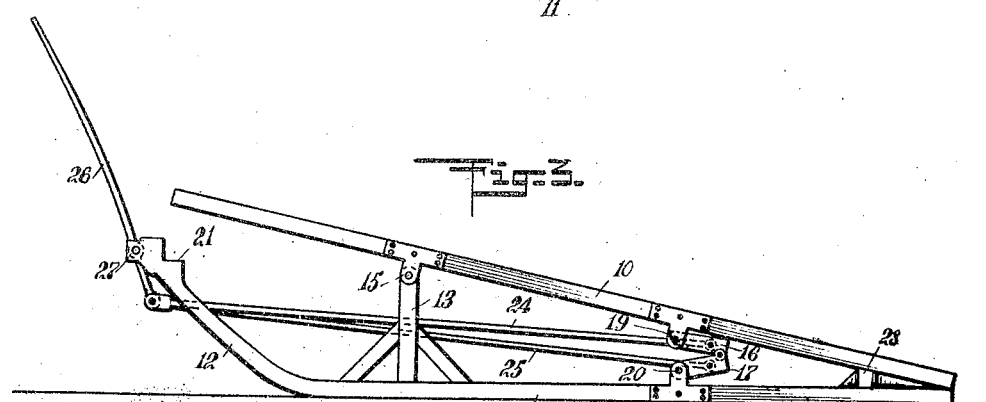
WITNESSES
C. W. Fairbank
F. G. Hochenburg
INVENTOR
John B. Carey
BY Munn & Co
ATTORNEYS

UNITED STATES PATENT OFFICE.

JOHN B. CAREY, OF ROSLYN, NEW YORK.

STONE-BOAT.

966,164.

Specification of Letters Patent.

Patented Aug. 2, 1910.

Application filed October 29, 1909. Serial No. 525,323.

*To all whom it may concern:*

Be it known that I, JOHN B. CAREY, a citizen of the United States, and a resident of Roslyn, in the county of Nassau and State of New York, have invented a new and Improved Stone-Boat, of which the following is a full, clear, and exact description.

This invention relates to certain improvements in drags or stone boats adapted for use in hauling stones, dirt or the like over soft ground, and the object of the invention is to so support the platform or floor that it may be very readily and quickly dumped without necessitating the inverting of the vehicle or the manual removal of the material.

My improved construction is substantially in the form of a sled with a platform and supporting runners, and the platform is so connected to the runners that it may rigidly be held in a substantially horizontal position, or one end of the platform may be dropped to permit the material to slide therefrom.

The invention consists in the construction and arrangement of parts set forth in the claims and one form of which is hereinafter described.

Reference is to be had to the accompanying drawings, forming a part of this specification, in which similar characters of reference indicate corresponding parts in all the figures, and in which—

Figure 1 is a top plan view of an apparatus constructed in accordance with my invention; Fig. 2 is a side view thereof with the platform supported in a horizontal position; and Fig. 3 is a side elevation with the platform in an inclined or dumped position.

In the specific form shown my improved stone boat or sled includes a platform 10, constructed in any suitable manner and adapted to support a load of stone, dirt or any other material which it is desired to transport. The platform may be reinforced, braced or strengthened in any suitable manner, but as the specific construction of the platform *per se* does not involve the present invention, no such reinforcement or bracing means is shown. The platform is supported by two side members or runners 11 of substantially the same length as the platform, and having their front end portion 12 inclined upwardly to facilitate the passage of the runners over uneven ground. The platform is connected to the runners and supported thereby, so as to be movable to either a horizontal position or an inclined position. This supporting means, as shown, includes two standards 13 and 14, spaced apart and connected to the under side of the platform at points approximately one-third the length of the platform from each end. The standard or support 13 is rigidly braced to the runner and is connected to the under side of the platform by a pivot 15. The rear standard or support is formed of two sections 16 and 17, having their ends normally abutting and connected by a hinge 18. The upper end of the upper section 16 is secured to the under side of the platform by a pivot 19, and the lower end of the lower section is connected to the runner by a pivot 20. The two sections thus constitute a toggle joint, and when in alinement are of such length that the platform is supported substantially horizontally. With the platform in a horizontal position, as indicated in Fig. 2, the front end thereof rests upon a shoulder or seat 21 at the front end of the runners, while the rear end of the platform is unsupported. With the load evenly distributed upon the platform, there will be no tendency of the platform to tip or tilt, and the presence of the driver upon the front end of the platform will additionally prevent any such tilting.

For dumping the load from the platform, I provide means for breaking the toggle joint and lowering the rear end of the platform, so that said platform will assume an inclined position, as indicated in Fig. 3. Various different forms of operating means may be employed for breaking the toggle, but as shown, I connect the two toggles by two transverse rods 22 and 23. These rods are substantially parallel and one of them connects the upper section 16 of one rear standard to the upper section 16 of the other standard, while the second rod connects the two lower sections 17, 17. To break the toggle, these two rods are forced rearwardly by means of two operating rods 24 and 25, which extend forwardly beneath the platform and connect to the lower end of a handle lever 26. This lever extends substantially vertically at the front end of the platform, and is fulcrumed upon a rod 27 extending across from the upper end of one runner to the upper end of the other. The upper end of the handle is directly in front of the driver on the load, and may readily be operated when it is desired to dump the load or restore the platform to its horizontal position. The driver on the load may hang on to the upper end of the handle and steady himself thereby, and by continually pulling back on said handle, he positively prevents the toggle from accidentally breaking during any jolting or jarring of the apparatus in passing over very rough or uneven ground.

When the platform is dumped, it tilts upon the front pivot 15 and the front end rises, while the rear end drops. For supporting the rear end of the platform in its lowered position, I may provide stops 28 upon the runners adjacent their rear ends and presenting upper inclined surfaces to coincide with the inclined under surface of the lower platform. If desired, the two stops 28 may be connected by a transverse brace 29 extending from one runner to the other and supporting the platform across its entire width when said platform is in dumping position.

Having thus described my invention, I claim as new and desire to secure by Letters Patent:

1. In combination, two runners having upwardly-turned front ends, a platform having the front end thereof adapted to engage with the upturned front ends of the runners, standards mounted on said runners and pivotally secured to the platform in front of the center of gravity of the latter, standards mounted on said runners in the rear of the first-mentioned standards and adapted to support said platform in the rear of the center of gravity of the latter, said last-mentioned standards including toggle joints which when broken permit the rear end of the platform to move downwardly, and stops upon the rear ends of the runners for limiting the downward movement of the rear end of the platform and supporting the latter when in lowered position.

2. In combination, two runners having upwardly-turned front ends, a platform having the front end thereof adapted to engage with the upturned front ends of the runners, standards mounted on said runners and pivotally secured to the platform in front of the center of gravity of the latter, and standards mounted on said runners in the rear of the first-mentioned standards and adapted to support said platform in the rear of the center of gravity of the latter, said last-mentioned standards including toggle joints which when broken permit the rear end of the platform to move downwardly.

3. In combination, two runners, a platform, standards mounted on said runners and pivotally secured to the latter at a point intermediate the front end and the center of the platform, standards carried by said runners in the rear of said first-mentioned standards and pivotally secured to the platform intermediate the rear end of the latter and the center of the platform, said last-mentioned standards including two pivotally-connected sections, the pivotal point being movable rearwardly to permit the lowering of the rear end of the platform, an upwardly-extending lever pivoted adjacent the front ends of the runners, and means connecting said lever below the pivotal support of the latter and to said second-mentioned standards, whereby when the upper end of the lever is moved forwardly, the rear end of the platform is lowered.

In testimony whereof I have signed my name to this specification in the presence of two subscribing witnesses.

JOHN B. CAREY.

Witnesses:
CHESTER P. CAREY,
THERESA HARRISON.